(12) United States Patent
Nakazawa et al.

(10) Patent No.: US 11,657,709 B2
(45) Date of Patent: May 23, 2023

(54) SAFETY CONFIRMATION SUPPORT SYSTEM AND SAFETY CONFIRMATION SUPPORT METHOD

(71) Applicant: Panasonic Intellectual Property Management Co., Ltd., Osaka (JP)

(72) Inventors: Masakazu Nakazawa, Osaka (JP); Kyoko Ueda, Osaka (JP); Nobutaka Kitajima, Osaka (JP); Mutsumi Kawagoe, Osaka (JP); Tadashi Yoshida, Osaka (JP); Yasuhiro Ito, Osaka (JP); Kenji Oga, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 17/538,034

(22) Filed: Nov. 30, 2021

(65) Prior Publication Data

US 2022/0189301 A1 Jun. 16, 2022

(30) Foreign Application Priority Data

Dec. 14, 2020 (JP) .............................. JP2020-206871

(51) Int. Cl.
*G08G 1/0962* (2006.01)
*G06F 3/01* (2006.01)
(Continued)

(52) U.S. Cl.
CPC .......... *G08G 1/09626* (2013.01); *B60R 1/22* (2022.01); *G06F 3/013* (2013.01); *G06F 3/1423* (2013.01); *G06T 11/00* (2013.01)

(58) Field of Classification Search
CPC ....... G08G 1/09626; B60R 1/22; G06F 3/013; G06F 3/1423; G06T 11/00
See application file for complete search history.

(56) References Cited

U.S. PATENT DOCUMENTS

2010/0198513 A1* 8/2010 Zeng ....................... G01S 17/89
701/300
2015/0042799 A1* 2/2015 Zhang .................... G06V 20/58
348/148

(Continued)

FOREIGN PATENT DOCUMENTS

JP 6252365 12/2017

*Primary Examiner* — Terrell M Robinson
(74) *Attorney, Agent, or Firm* — Greenblum & Bernstein P.L.C.

(57) ABSTRACT

A safety confirmation support system includes: a moving object detector which detects a moving object in each of detection regions set around the vehicle; display units each associated with a different one of the detection regions; a line-of-sight detector which detects a line of sight of the driver; and a display controller which controls the display units based on detection results from the moving object detector and the line-of-sight detector. When the moving object is detected in a specified detection region, the display controller (i) displays moving object information on a specified display unit associated with the specified detection region when the line of sight is away from the specified detection region, and (ii) stops display of the moving object information on the specified display unit when the line of sight is towards the specified detection region while the moving object information is displayed on the specified display unit.

8 Claims, 9 Drawing Sheets

(51) Int. Cl.
*B60R 1/22* (2022.01)
*G06T 11/00* (2006.01)
*G06F 3/14* (2006.01)

(56) References Cited

U.S. PATENT DOCUMENTS

| | | |
|---|---|---|
| 2015/0360565 A1 | 12/2015 | Goto et al. |
| 2016/0063761 A1* | 3/2016 | Sisbot .................... G06T 19/006 345/633 |
| 2017/0232892 A1* | 8/2017 | Sasano .................... G08G 1/166 701/301 |
| 2017/0323164 A1* | 11/2017 | Kishi ................. G02B 27/0179 |
| 2020/0242374 A1* | 7/2020 | Nakazawa .............. B60R 11/04 |

* cited by examiner

SAFETY CONFIRMATION SUPPORT SYSTEM AND SAFETY CONFIRMATION SUPPORT METHOD

CROSS REFERENCE TO RELATED APPLICATION

The present application is based on and claims priority of Japanese Patent Application No. 2020-206871 filed on Dec. 14, 2020.

FIELD

The present disclosure relates to a safety confirmation support system and a safety confirmation support method that support a safety confirmation of a driver of a vehicle.

BACKGROUND

A safety confirmation support system is known which supports a safety confirmation of the driver of a vehicle. The safety confirmation support system disclosed in Patent Literature (PTL) 1 includes: a moving object detector which detects a moving object approaching the vehicle in each of a plurality of detection regions set around the vehicle; a plurality of display units which are formed of head-up display devices; and a display controller which controls the display units based on the detection result of the moving object detector.

The detection regions include, for example, a first detection region positioned at a front left area of the vehicle and a second detection region positioned at a front right area of the vehicle. The display units include, for example, a left display unit positioned at a lower left portion of the windshield of the vehicle and a right display unit positioned at a lower right portion of the windshield of the vehicle. The first detection region and the second detection region are respectively associated with the right display unit and the left display unit.

For example, when the vehicle is temporarily stopped at a T-shaped junction in order to turn right, and another vehicle is approaching the vehicle from the left-hand side of the vehicle, the moving object detector detects the approaching vehicle that is present in the first detection region as a moving object. At this time, the display controller displays a moving object image which indicates the moving object on the right display unit associated with the first detection region, based on the detection result of the moving object detector.

Accordingly, for example, when the driver is gazing at the destination of the vehicle turning right, the moving object information displayed on the right display unit enters the sight of the driver. Hence, it is possible to notify the driver of the presence of the moving object detected in the first detection region that is in the direction opposite to the direction at which the driver is gazing.

CITATION LIST

Patent Literature

PTL 1: Japanese Patent No. 6252365

SUMMARY

However, the conventional safety confirmation support system described above can be improved upon.

In view of this, the present disclosure provides a safety confirmation support system and a safety confirmation support method capable of improving upon the above related art.

A safety confirmation support system according to one aspect of the present disclosure is a safety confirmation support system which supports a safety confirmation of a driver of a vehicle. The safety confirmation support system includes: a moving object detector which detects a moving object that is coming relatively close to the vehicle in each of a plurality of detection regions set around the vehicle; a plurality of display units provided in different directions when viewed from the driver, each of the plurality of display units being associated with a different one of the plurality of detection regions; a line-of-sight detector which detects a line of sight of the driver; and a display controller which controls the plurality of display units based on a detection result from the moving object detector and a detection result from the line-of-sight detector. On condition that the moving object is detected in a specified detection region among the plurality of detection regions, the display controller (i) displays moving object information that relates to the moving object on a specified display unit associated with the specified detection region among the plurality of display units when the line of sight of the driver is away from the specified detection region, and (ii) stops display of the moving object information on the specified display unit when the line of sight of the driver is towards the specified detection region while the moving object information is displayed on the specified display unit.

General and specific aspects disclosed above may be implemented using a system, a method, an integrated circuit, a computer program, or a computer-readable recording medium such as a compact disc-read only memory (CD-ROM), or any combination of systems, methods, integrated circuits, computer programs, or computer-readable recording media.

A safety confirmation support system and the like according to one aspect of the present disclosure is capable of improving upon the above related art.

BRIEF DESCRIPTION OF DRAWINGS

These and other advantages and features of the present disclosure will become apparent from the following description thereof taken in conjunction with the accompanying drawings that illustrate a specific embodiment of the present disclosure.

DESCRIPTION OF EMBODIMENT

Figure 1:
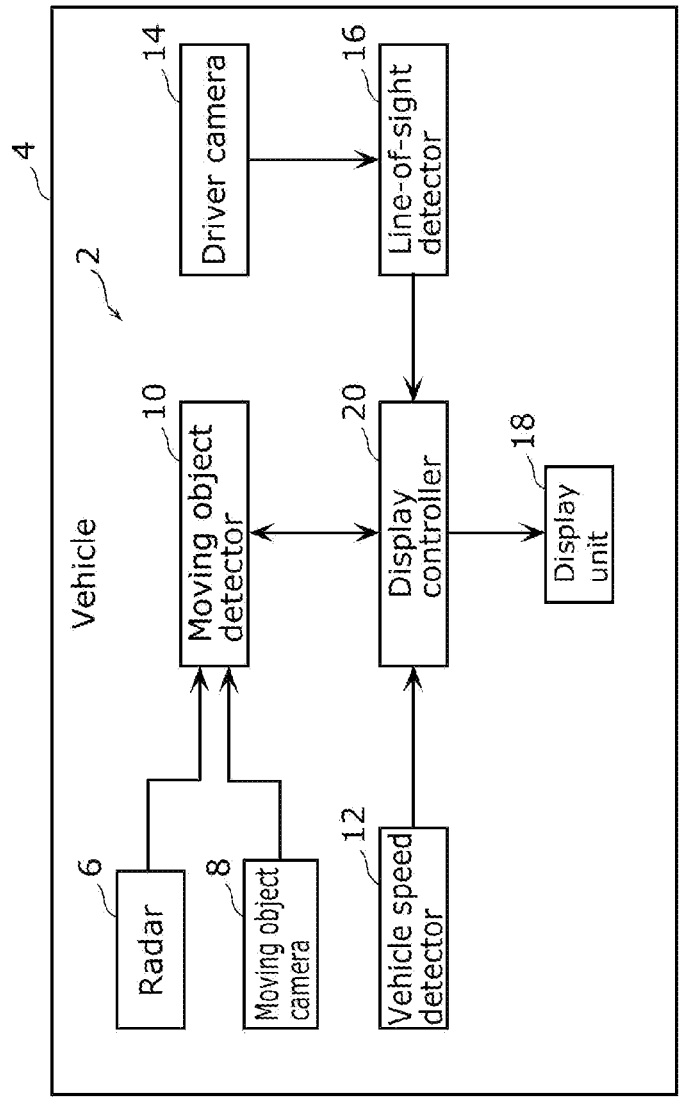
FIG. 1 is a block diagram illustrating a configuration of a safety confirmation support system according to an embodiment.

Underlying Knowledge Forming Basis of the Present Disclosure

The inventors of the present application have found the following problems related to the safety confirmation support system described in the "background" section.

For example, in response to an image of a moving object that is displayed on the right display unit, even in the case where the driver looks towards the first detection region to visually confirm the moving object, the image of the moving object will continue to be displayed on the right display unit. As a result, when the driver returns the line of sight back towards the destination of the vehicle turning right, the image of the moving object that is displayed on the right display unit enters the sight of the driver again. This can lead to a problem in that the driver accidentally mistakes the moving object for another moving object approaching the vehicle.

In order to solve such a problem, a safety confirmation support system according to one aspect of the present disclosure is a safety confirmation support system which supports a safety confirmation of a driver of a vehicle. The safety confirmation support system includes: a moving object detector which detects a moving object that is coming relatively close to the vehicle in each of a plurality of detection regions set around the vehicle; a plurality of display units provided in different directions when viewed from the driver, each of the plurality of display units being associated with a different one of the plurality of detection regions; a line-of-sight detector which detects a line of sight of the driver; and a display controller which controls the plurality of display units based on a detection result from the moving object detector and a detection result from the line-of-sight detector. On condition that the moving object is detected in a specified detection region among the plurality of detection regions, the display controller (i) displays moving object information that relates to the moving object on a specified display unit associated with the specified detection region among the plurality of display units when the line of sight of the driver is away from the specified detection region, and (ii) stops display of the moving object information on the specified display unit when the line of sight of the driver is towards the specified detection region while the moving object information is displayed on the specified display unit.

With this, the display controller stops the display of the moving object information on the specified display unit, when the line of sight of the driver is towards the specified detection region while the moving object information is displayed on the specified display unit. As such, because the driver is capable of recognizing that a safety confirmation relative to the moving object detected by the moving object detector has been reliably performed, an accurate safety confirmation can be brought to the attention of the driver.

For example, it may be that the display controller further: determines a degree of risk of the moving object based on the detection result from the moving object detector; and stops the display of the moving object information on the specified display unit when the degree of risk of the moving object becomes lower than a predetermined threshold while the moving object information is displayed on the specified display unit.

With this, when the degree of risk of the moving object becomes lower than the predetermined threshold, a safety confirmation relative to the moving object becomes unnecessary. Hence, unnecessary display of the moving object information can be eliminated by stopping the display of the moving object information on the specified display unit.

For example, it may be that the display controller further: determines a degree of risk of a road condition in the specified detection region based on the detection result from the moving object detector; and stops the display of the moving object information on the specified display unit when the degree of risk of the road condition becomes lower than a predetermined threshold while the moving object information is displayed on the specified display unit.

With this, when the degree of risk of the road conditions becomes lower than the predetermined threshold, a safety confirmation relative to the moving object becomes unnecessary. Hence, unnecessary display of the moving object information can be eliminated by stopping the display of the moving object information on the specified display unit.

For example, it may be that, when displaying the moving object information on the specified display unit, the display controller further changes a display mode of the moving object information on the specified display unit according to a state of the moving object.

With this, the display mode of the moving object information on the specified display unit is changed according to the state of the moving object, a safety confirmation relative to the moving object can be efficiently brought to the attention of the driver.

For example, it may be that the display controller further: determines a degree of risk of the moving object based on the detection result from the moving object detector, and when displaying the moving object information on the specified display unit, highlights the moving object information when the degree of risk of the moving object is higher than or equal to a predetermined threshold, and does not highlight the moving object information when the degree of risk of the moving object is lower than the predetermined threshold.

With this, a safety confirmation relative to the moving object corresponding to the moving object information highlighted in the display can be brought to the attention of the driver.

For example, it may be that, when a plurality of the moving objects are detected in the specified detection region, the display controller displays a plurality of items of moving object information that relate to the plurality of moving objects as a group on the specified display unit.

With this, the plurality of items of moving object information can be simplified for display.

A safety confirmation support method according to one aspect of the present disclosure is a safety confirmation support method which supports a safety confirmation of a driver of a vehicle. The safety confirmation support method includes: (a) detecting a moving object that is coming relatively close to the vehicle in each of a plurality of detection regions set around the vehicle; (b) detecting a line of sight of the driver; and (c) controlling a plurality of display units based on a detection result obtained in the detecting in (a) and a detection result obtained in the detecting in (b), the plurality of display units being provided in different directions when viewed from the driver and each being associated with a different one of the plurality of detection regions. When the moving object is detected in a specified detection region among the plurality of detection regions, the controlling in (c) includes (i) displaying moving object information that relates to the moving object on a specified display unit associated with the specified detection region among the plurality of display units when the line of sight of the driver is away from the specified detection region, and (ii) stopping display of the moving object information on the specified display unit when the line of sight of the driver is towards the specified detection region while the moving object information is displayed on the specified display unit.

With this, the display of the moving object information on the specified display unit is stopped when the line of sight of the driver is towards the specified detection region while the moving object information is displayed on the specified display unit. Accordingly, because the driver is capable of recognizing that a safety confirmation relative to the detected moving object has been reliably performed, an accurate safety confirmation can be brought to the attention of the driver.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Hereinafter, an embodiment will be specifically described with reference to the drawings.

The embodiment described below shows a general or specific example. The numerical values, shapes, materials, structural elements, the arrangement and connection of the structural elements, steps, the processing order of the steps etc. shown in the following embodiment are mere examples, and therefore do not limit the present disclosure. Among the structural elements in the following embodiment, structural elements not recited in any one of the independent claims defining the most generic concept are described as optional structural elements.

Embodiment

1. Configuration of Safety Confirmation Support System

Figure 2:
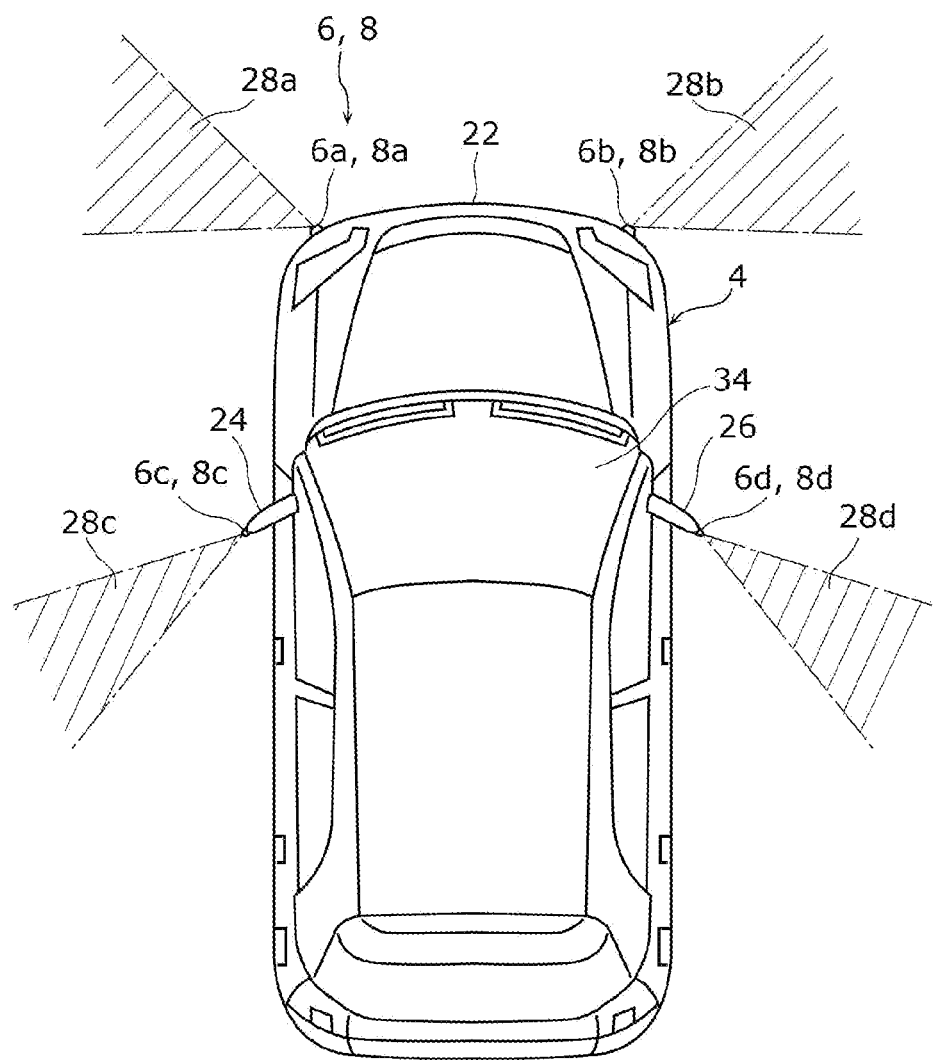
FIG. 2 illustrates an example of a plurality of detection regions set around a vehicle in the safety confirmation support system according to the embodiment.
Figure 3:
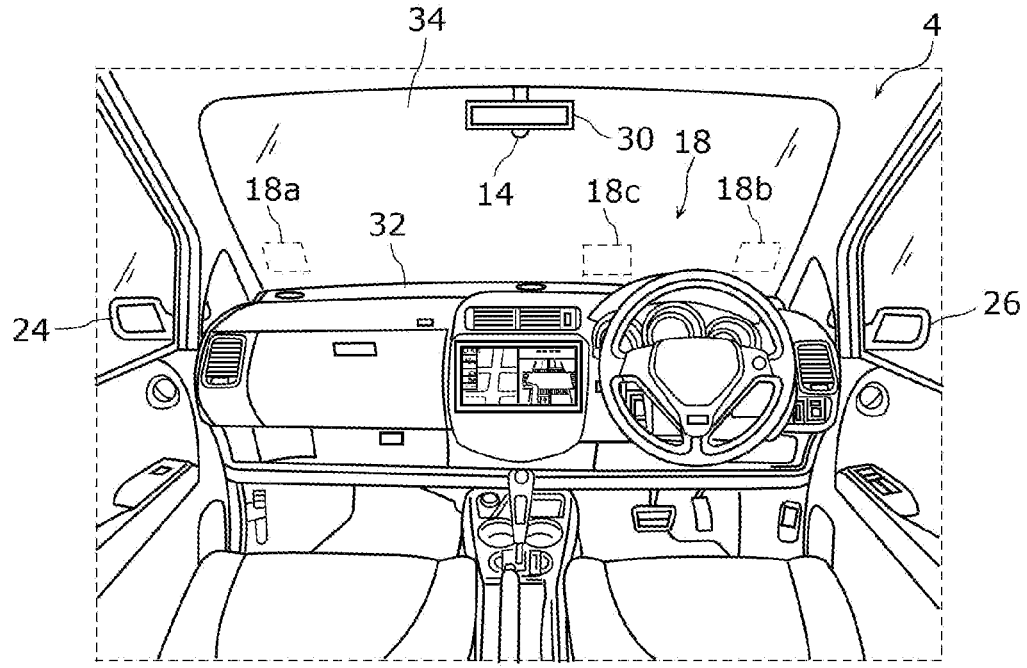
FIG. 3 illustrates an example of a display unit mounted in the vehicle in the safety confirmation support system according to the embodiment.

First, with reference to FIG. 1 to FIG. 3, a configuration of safety confirmation support system 2 according to an embodiment will be described. FIG. 1 is a block diagram illustrating a configuration of safety confirmation support system 2 according to the embodiment. FIG. 2 illustrates an example of a plurality of detection regions set around vehicle 4 in safety confirmation support system 2 according to the embodiment. FIG. 3 illustrates an example of display unit 18 mounted in vehicle 4 in safety confirmation support system 2 according to the embodiment.

It should be noted that in the present description, the term "front" refers to the forward direction of vehicle 4, the term "left" refers to the left side relative to the forward direction of vehicle 4, and the term "right" refers to the right side relative to the forward direction of vehicle 4.

As illustrated in FIG. 1, safety confirmation support system 2 is a system for supporting a safety confirmation of the driver of vehicle 4 such as an automobile, and is mounted in vehicle 4. Safety confirmation support system 2 includes radar 6, moving object camera 8, moving object detector 10, vehicle speed detector 12, driver camera 14, line-of-sight detector 16, display unit 18, and display controller 20.

Radar 6 outputs electrical waves towards each of a plurality of detection regions set around vehicle 4. Upon the reception of reflected waves that are the electrical waves reflected by a moving object that is present in the detection region, radar 6 outputs target information indicating that the moving object is present in the detection region to moving object detector 10. The moving object is a moving object that is coming relatively close to vehicle 4, and is, for example, another vehicle that is not vehicle 4, a bicycle, or a pedestrian.

Specifically, as illustrated in FIG. 2, radar 6 includes first radar 6a provided on the left edge of front bumper 22 of vehicle 4, second radar 6b provided on the right edge of front bumper 22 of vehicle 4, third radar 6c provided on left side mirror 24 of vehicle 4, and fourth radar 6d provided on right side mirror 26 of vehicle 4.

First radar 6a outputs electrical waves towards first detection region 28a that is set in the front left area of vehicle 4. Upon the reception of reflected waves that are the electrical waves reflected by a moving object that is present in first detection region 28a, first radar 6a outputs target information indicating that the moving object is present in first detection region 28a to moving object detector 10.

Second radar 6b outputs electrical waves towards second detection region 28b that is set in the front right area of vehicle 4. Upon the reception of reflected waves that are the electrical waves reflected by a moving object that is present in second detection region 28b, second radar 6b outputs target information indicating that the moving object is present in second detection region 28b to moving object detector 10.

Third radar 6c outputs electrical waves towards third detection region 28c that is set on the left side of vehicle 4. Upon the reception of reflected waves that are the electrical waves reflected by a moving object that is present in third detection region 28c, third radar 6c outputs target information indicating that the moving object is present in third detection region 28c to moving object detector 10.

Fourth radar 6d outputs electrical waves towards fourth detection region 28d that is set on the right side of vehicle 4. Upon the reception of reflected waves that are the electrical waves reflected by a moving object that is present in fourth detection region 28d, fourth radar 6d outputs target information indicating that the moving object is present in fourth detection region 28d to moving object detector 10.

First detection region 28a, second detection region 28b, third detection region 28c, and fourth detection region 28d are examples of a plurality of detection regions.

Moving object camera 8 captures images of the respective detection regions set around vehicle 4, and outputs image information of the captured images of the detection regions to moving object detector 10. Specifically, as illustrated in FIG. 2, moving object camera 8 includes first moving object camera 8a provided on the left edge of front bumper 22 of vehicle 4, second moving object camera 8b provided on the right edge of front bumper 22 of vehicle 4, third moving object camera 8c provided on left side mirror 24 of vehicle 4, and moving object camera 8d provided on right side mirror 26 of vehicle 4.

First moving object camera 8a captures an image of first detection region 28a, and outputs image information of the captured image of first detection region 28a to moving object detector 10. Second moving object camera 8b captures an image of second detection region 28b, and outputs image information of the captured image of second detection region 28b to moving object detector 10. Third moving object camera 8c captures an image of third detection region 28c, and outputs image information of the captured image of third detection region 28c to moving object detector 10. Fourth moving object camera 8d captures an image of fourth detection region 28d, and outputs image information of the captured image of fourth detection region 28d to moving object detector 10.

Moving object detector 10 detects one or more moving objects that are coming relatively close to vehicle 4 in each of the detection regions, by analyzing the target information from radar 6. Moving object detector 10 also determines the type of each of the detected moving objects (for example, a vehicle, bicycle, or pedestrian) by analyzing the image information from moving object camera 8. This determination is carried out based on a plurality of templates that are pre-prepared and illustrate vehicles, bicycles, pedestrians, or the like. Moving object detector 10 determines the type of the moving object based upon comparison of each template to the moving object indicated by the image information. Moving object detector 10 outputs a detection result indicating the presence of a moving object and the type of the moving object to display controller 20.

Vehicle speed detector 12 detects the vehicle speed (traveling speed) of vehicle 4, and outputs vehicle speed information indicating the detected vehicle speed to display controller 20.

Driver camera 14 captures an image of the face of the driver of vehicle 4, and outputs the facial image that is a captured image of the face of the driver to line-of-sight detector 16. As illustrated in FIG. 3, driver camera 14 is provided, for example, on room mirror 30 in the interior of the vehicle cabin of vehicle 4.

Line-of-sight detector 16 detects the line of sight of the driver by analyzing the facial image from driver camera 14. Specifically, line-of-sight detector 16 detects the line of sight of the driver based on the position of the retina (pupil) that is specified by the facial image from driver camera 14. Line-of-sight detector 16 outputs a detection result indicating the line of sight of the driver to display controller 20.

Display unit 18 is formed of, for example, a head-up display (HUD) device. Display unit 18 displays the virtual image formed on the screen (not illustrated) in dashboard 32 (see FIG. 3) of vehicle 4, in 2D in the space in front of windshield 34 (see FIG. 3) of vehicle 4. Accordingly, the driver is capable of seeing the virtual image imposed on the background that is in front of windshield 34.

Specifically, as illustrated in FIG. 3, display unit 18 includes left display unit 18a provided on the lower left portion of windshield 34 of vehicle 4, right display unit 18b provided on the lower right portion of windshield 34 of vehicle 4, and front display unit 18c provided on, rather than the lower central portion, more toward the lower right portion of windshield 34 of vehicle 4. In other words, left display unit 18a, right display unit 18b, and front display unit 18c are provided in different directions when viewed from the driver. Left display unit 18a, right display unit 18b, and front display unit 18c are examples of a plurality of display units.

Here, left display unit 18a is associated with second detection region 28b and third detection region 28c. Right display unit 18b is associated with first detection region 28a and fourth detection region 28d. Front display unit 18c is associated with first detection region 28a.

Display controller 20 controls display unit 18 based on each detection result from vehicle speed detector 12, moving object detector 10, and line-of-sight detector 16. Specifically, on condition that the vehicle speed detected by vehicle speed detector 12 is lower than or equal to a predetermined speed (for example, 5 km/h), when a moving object is detected in a specified detection region among the plurality of detection regions, and when the line of sight of the driver is away from the specified detection region, moving object information that relates to the moving object is displayed on a specified display unit associated with the specified detection region, among display units (left display unit 18a, right display unit 18b, and front display unit 18c). In addition, when the line of sight of the driver is towards the specified detection region while moving object information is displayed on the specified display unit, display controller 20 stops the display of the moving object information on the specified display unit.

When the line of sight of the driver is away from the specified detection region, in order that the driver can be more reliably made aware of the presence of the moving object, for example, light may be turned on (or blinking) in the interior of the vehicle, or sound may be output from the speaker in the interior of the vehicle.

2. Operation of Safety Confirmation Support System

Figure 4:
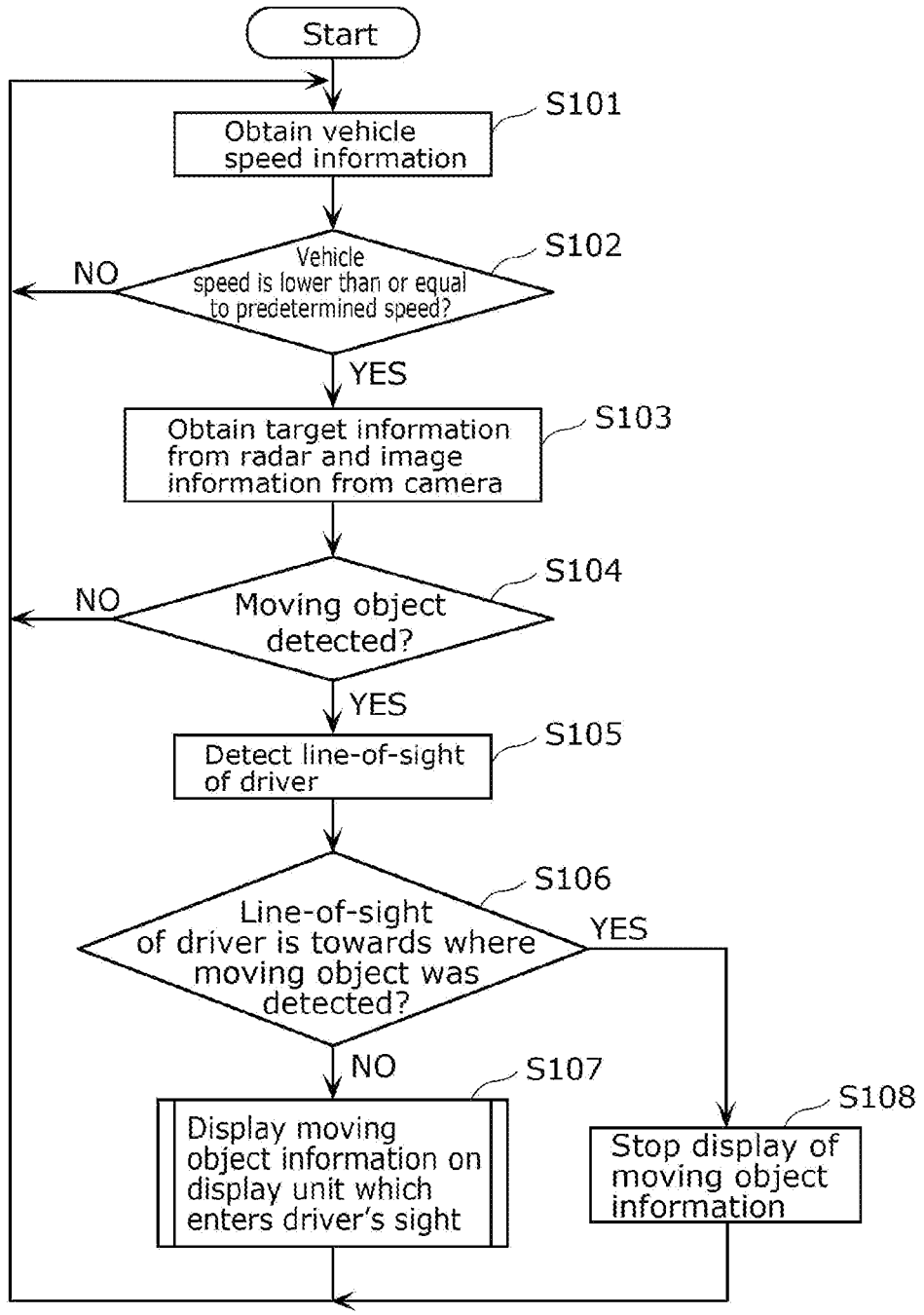
FIG. 4 is a flowchart illustrating an operation of the safety confirmation support system according to the embodiment.
Figure 5:
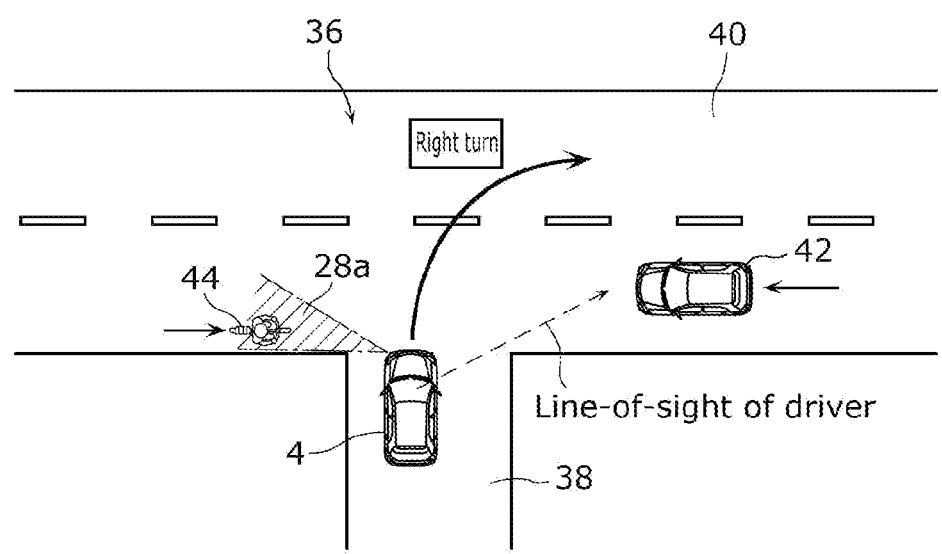
FIG. 5 illustrates an operation of the safety confirmation support system according to the embodiment.
Figure 6:
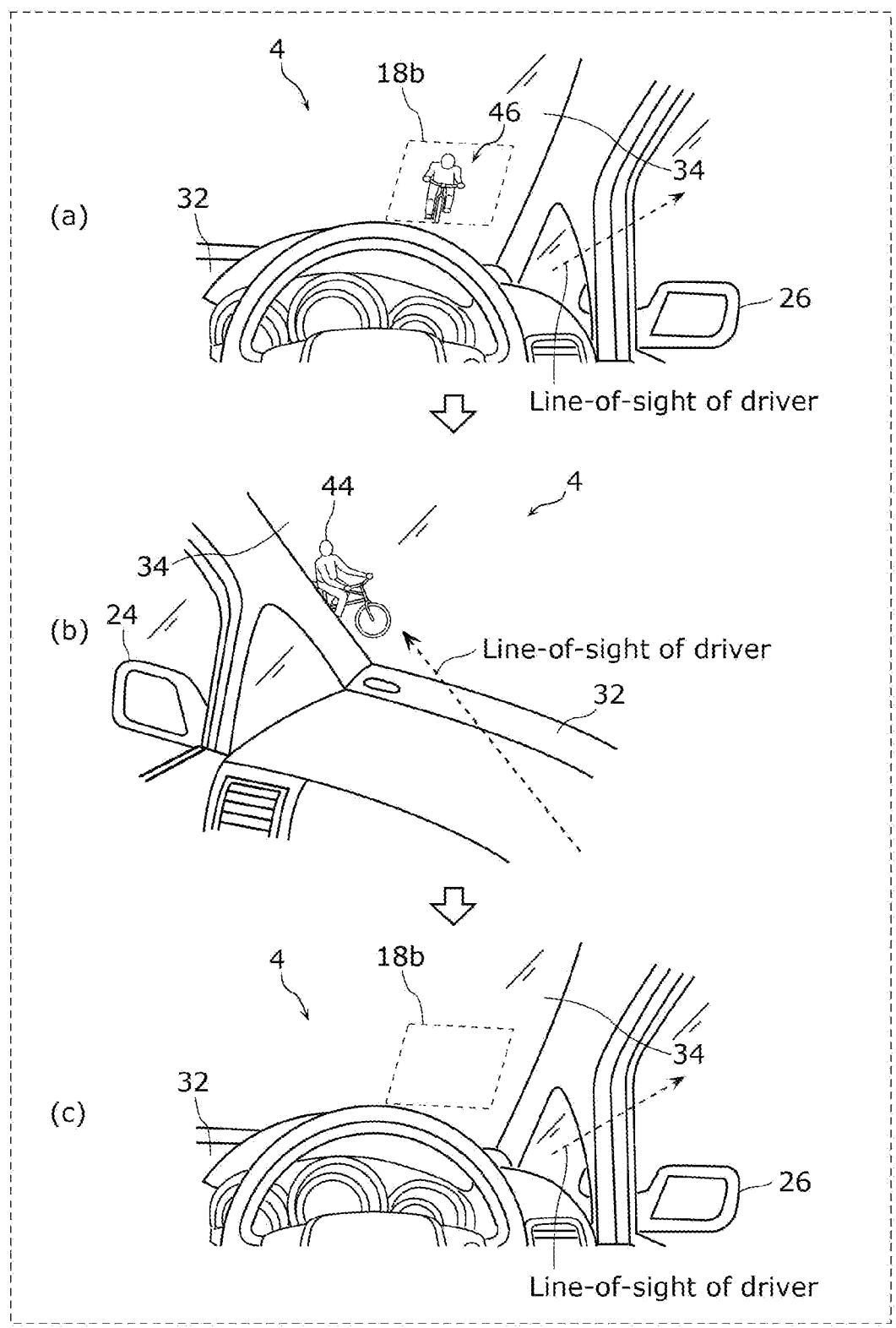
FIG. 6 illustrates an operation of the safety confirmation support system according to the embodiment.

Next, with respect to FIG. 4 to FIG. 6, an operation of safety confirmation support system 2 according to the embodiment will be described. FIG. 4 is a flowchart illustrating an operation of safety confirmation support system 2 according to the embodiment. FIG. 5 and FIG. 6 each illustrate an operation of safety confirmation support system 2 according to the embodiment.

As illustrated in FIG. 4, first, display controller 20 obtains vehicle speed information from vehicle speed detector 12 (S101), and then determines whether or not the vehicle speed indicated by the obtained vehicle speed information is lower than or equal to a predetermined speed (S102). This is because safety confirmation support system 2 according to the embodiment has a specification to support a safety confirmation of the driver when vehicle 4 is temporarily stopped or moving at low speed. When the vehicle speed is higher than the predetermined speed (No in S102), the driving state is not a state where the safety confirmation of the driver should be supported. Hence, the process is returned to step S101.

When the vehicle speed is lower than or equal to the predetermined speed (Yes in S102), the driving state is a state where the safety confirmation of the driver should be supported. Hence, display controller 20 transmits a command to moving object detector 10. Moving object detector 10 obtains the target information from radar 6 and the image information from moving object camera 8 based on the command from display controller 20 (S103), and detects the presence or absence of a moving object that is coming relatively close to vehicle 4 in each of the plurality of detection regions, based on the obtained target information (S104). When no moving object is present in the plurality of detection regions (No in S104), the process is returned to step S101.

An operation of safety confirmation support system 2 in the situation illustrated in FIG. 5 will be described below. In the situation illustrated in FIG. 5, in order to turn right into priority road 40 (a wide road) from non-priority road 38 (a narrow road) at T-junction 36, vehicle 4 (hereafter, referred to as "own vehicle 4") is temporarily stopped at non-priority road 38. On priority road 40, there are another vehicle 42 approaching own vehicle 4 from the right-hand side of vehicle 4, and bicycle 44 approaching own vehicle 4 from the left-hand side of own vehicle 4.

Returning to the flowchart in FIG. 4, when moving object detector 10 detects bicycle 44 that is present in first detection region 28a as a moving object based on the target information from first radar 6a (Yes in S104), moving object detector 10 determines the type of the moving object that is present in first detection region 28a as a "bicycle" based on the image information from first moving object camera 8a.

Subsequently, line-of-sight detector 16 detects the line of sight of the driver of own vehicle 4 (S105). Display controller 20 determines, based on the detection result from line-of-sight detector 16, whether or not the line of sight of the driver of own vehicle 4 is towards first detection region 28a where the moving object was detected (S106).

In the situation illustrated in FIG. 5, the driver of own vehicle 4 is gazing at the front right direction of own vehicle 4 for the purpose of a safety confirmation relative to another vehicle 42 approaching from the right-hand side, and the driver of own vehicle 4 is ignoring a safety confirmation relative to bicycle 44 approaching from the left-hand side. In this case, display controller 20 determines, based on the detection result from line-of-sight detector 16, that the line of sight of the driver of own vehicle 4 is away from first detection region 28a where the moving object was detected (No in S106).

Display controller 20 selects right display unit 18b associated with first detection region 28a where the moving object was detected, from among left display unit 18a, right display unit 18b, and front display unit 18c. At this time, as illustrated in (a) of FIG. 6, right display unit 18b that was selected is within the sight of the driver who is gazing at the front right direction of vehicle 4.

Display controller 20 displays moving object information 46 that relates to the moving object detected in first detection region 28a on right display unit 18b that was selected (S107). Moving object information 46 is, for example, an image which is generated based on the image information from first moving object camera 8a and indicates bicycle 44 that is the moving object. At this time, nothing is displayed on left display unit 18a and front display unit 18c that are not associated with first detection region 28a.

Accordingly, the driver who is gazing at the front right direction of own vehicle 4 can be notified of the presence of bicycle 44 that is the moving object detected in first detection region 28a in the opposite direction to the gazing direction.

When it is determined in step S106 that the line of sight of the driver of own vehicle 4 is towards first detection region 28a where the moving object was detected, there is a high possibility that the driver of own vehicle 4 is visually confirming bicycle 44 that is the moving object detected in first detection region 28a. As such, the moving object information is not displayed on left display unit 18a because even through left display unit 18a is in the sight of the driver of own vehicle 4, left display unit 18a is not associated with first detection region 28a.

Upon completion of step S107, the process is returned to step S101, and the above described steps S101 to S106 are repeated.

In step S106, as illustrated in (b) of FIG. 6, it is assumed that the driver has visually confirmed bicycle 44 by directing the line of sight of the driver towards first detection region 28a in response to that moving object information 46 was displayed on right display unit 18b. In this case, display controller 20 determines, based on the detection result from line-of-sight detector 16, that the line of sight of the driver of own vehicle 4 is towards first detection region 28a where the moving object was detected (YES in S106), and stops the display of moving object information 46 on right display unit 18b (S108). Subsequently, the process is returned to step S101.

Accordingly, as illustrated in (c) of FIG. 6, moving object information 46 displayed on right display unit 18b is removed. Hence, even when the line of sight of the driver of own vehicle 4 is returned towards the front right direction of own vehicle 4, nothing is displayed on right display unit 18b. Accordingly, moving object information 46 does not enter the sight of the driver. As a result, it is possible for the driver of own vehicle 4 to recognize that a safety confirmation relative to bicycle 44 that is approaching from the left-hand side has been reliably performed.

In contrast to the situation illustrated in FIG. 5, it is assumed that on priority road 40, there are another vehicle 42 approaching own vehicle 4 from the left-hand side of own vehicle 4, and bicycle 44 approaching own vehicle 4 from the right-hand side of own vehicle 4. In this case, the driver of own vehicle 4 tends to ignore a safety confirmation relative to bicycle 44 approaching from the right-hand side, as the driver of own vehicle 4 gazes at the front left direction of own vehicle 4 for the purpose of a safety confirmation relative to another vehicle 42 approaching from the left-hand side.

As such, when it is determined based on the detection result from line-of-sight detector 16 that the line of sight of the driver of own vehicle 4 is away from second detection region 28b where a moving object was detected, display controller 20 displays moving object information 46 that relates to the moving object detected in second detection region 28b on left display unit 18a associated with second detection region 28b. Accordingly, the driver who is gazing at the front left direction of own vehicle 4 can be notified of the presence of bicycle 44 that is the moving object detected in second detection region 28b in the opposite direction to the gazing direction. In addition, when it is determined based on the detection result from line-of-sight detector 16 that the line of sight of the driver of own vehicle 4 is towards second detection region 28b where the moving object was detected, display controller 20 stops the display of moving object information 46 on left display unit 18a.

In addition, with the steering wheel on the right in own vehicle 4, the driver seat is mounted on the right side. Hence, even when the line of sight of the driver is towards the front, the driver is less likely to notice a moving object approaching from the left-hand side of own vehicle 4, compared with a moving object approaching from the right-hand side of own vehicle 4. As such, in the situation illustrated in FIG. 5, when the line of sight of the driver is towards the front, display controller 20 determines, based on the detection result from line-of-sight detector 16, that the line of sight of the driver of own vehicle 4 is towards the front, and not towards first detection region 28a where the moving object was detected. In this case, display controller 20 displays moving object information 46 that relates to the moving object detected in first detection region 28a on front display unit 18c associated with first detection region 28a. In addition, when it is determined based on the detection result from line-of-sight detector 16 that the line of sight of the driver of own vehicle 4 is towards first detection region 28a where the moving object was detected, display controller 20 stops the display of moving object information 46 on front display unit 18c.

When moving object detector 10 detects a moving object in third detection region 28c or fourth detection region 28d, too, processes similar to the processes in steps S101 to S108 described above are performed.

3. Advantageous Effects

As described above, in the present embodiment, while moving object information 46 is displayed on a specified display unit and when the line of sight of the driver is towards the specified detection region associated with the specified display unit, display controller 20 stops the display of moving object information 46 on the specified display unit.

Accordingly, because the driver is capable of recognizing that a safety confirmation relative to the moving object detected by moving object detector 10 has been reliably performed, an accurate safety confirmation can be brought to the attention of the driver.

4. Another Operation of Safety Confirmation Support System

Figure 7:
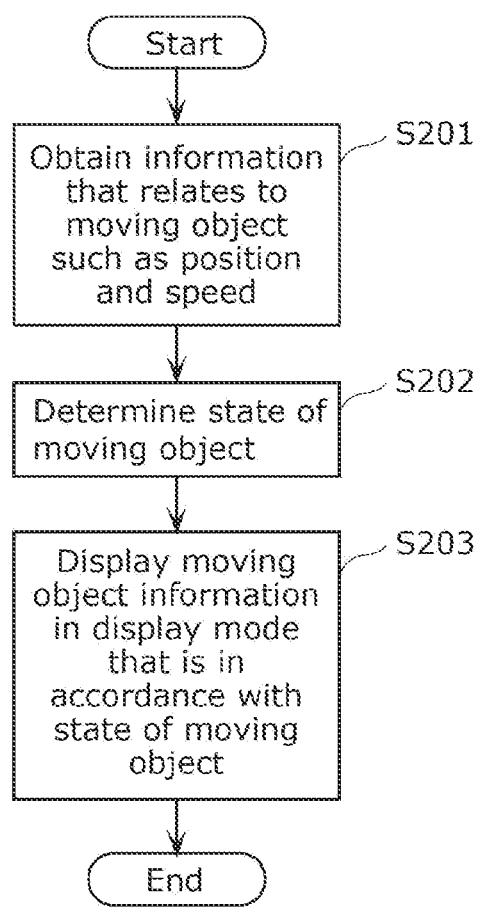
FIG. 7 is a flowchart that specifically illustrates the details of step S107 in the flowchart of FIG. 4.
Figure 8:
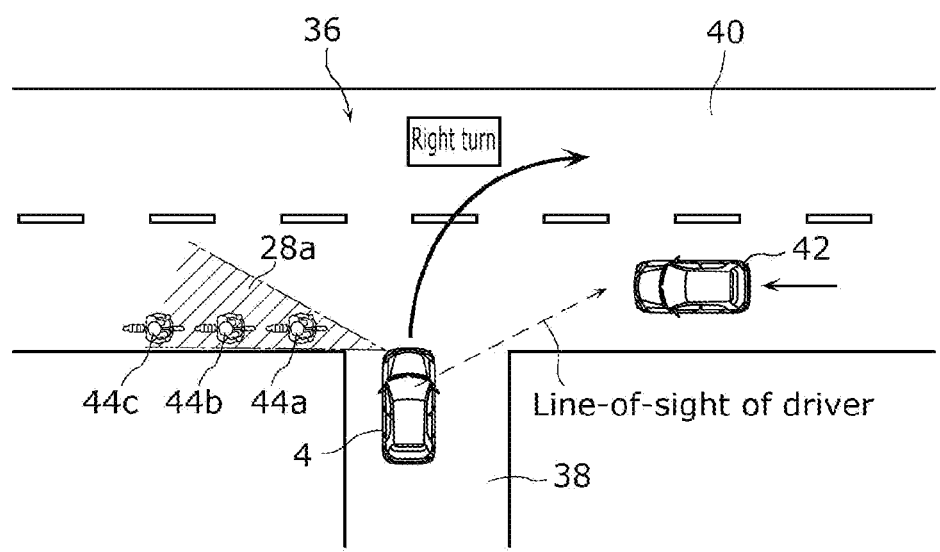
FIG. 8 illustrates another operation of the safety confirmation support system according to the embodiment.
Figure 9:
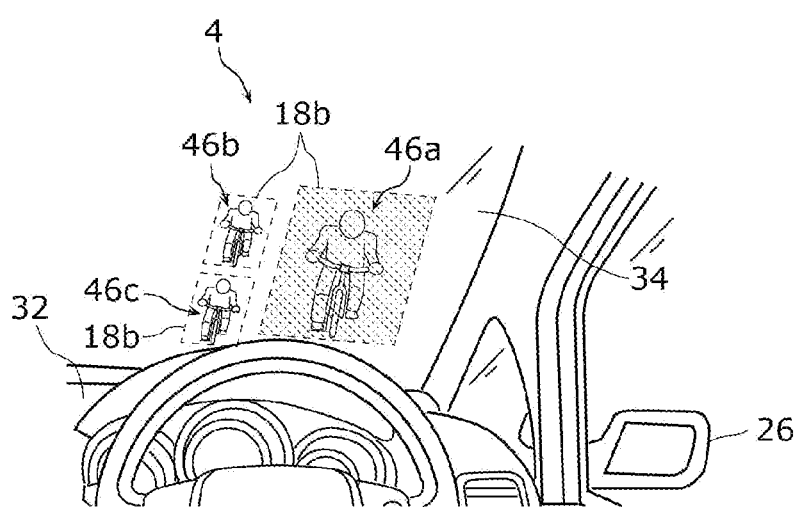
FIG. 9 illustrates another operation of the safety confirmation support system according to the embodiment.

Next, with respect to FIG. 7 to FIG. 9, another operation of safety confirmation support system 2 according to the embodiment will be described. FIG. 7 is a flowchart that illustrates specifically the details of step S107 in the flowchart of FIG. 4. FIG. 8 and FIG. 9 illustrate other operations of safety confirmation support system 2 according to the embodiment.

In addition to the processes described above, when displaying moving object information on a specified display, display controller 20 performs a process for changing the display mode of the moving object information on the specified display unit according to the state of the moving object.

Specifically, display controller 20 determines the degree of risk of the moving object detected in any of the plurality of detection regions, based on the detection result from moving object detector 10. The degree of risk refers to an index which indicates the level of impact on the safety of own vehicle 4 by the moving object. When displaying moving object information on a specified display unit, on condition that the degree of risk of the moving object is higher than or equal to a predetermined threshold, display controller 20 highlights the moving object information, and on condition that the degree of risk of the moving object is lower than the predetermined threshold, display controller 20 does not highlight the moving object information.

For example, when the moving speed of the moving object is relatively fast, or when the distance between own vehicle 4 and the moving object is relatively close, the impact on the safety of own vehicle 4 by the moving object is relatively high, and thus, the degree of risk of the moving object is set to be higher than or equal to the predetermined threshold. On the other hand, for example, when the moving speed of the moving object is relatively slow, or when the distance between own vehicle 4 and the moving object is relatively far, due to the impact on the safety of own vehicle 4 by the moving object being relatively low, the degree of risk of the moving object is set to be lower than the predetermined threshold.

Hereafter, with reference to FIG. 7 to FIG. 9, the details of step S107 in the flowchart of FIG. 4 will be specifically described. As illustrated in FIG. 7, first, display controller 20 obtains, for example, position and speed information of the moving object detected, based on the detection result from moving object detector 10 (S201). Next, display controller 20 determines the state of the moving object (the degree of risk of the moving object) (S202), and displays moving object information on a specified display unit in a display mode that is in accordance with the state of the moving object (S203).

Here, another operation of safety confirmation support system 2 in the situation illustrated in FIG. 8 will be described. In the situation illustrated in FIG. 8, own vehicle 4 is temporarily stopped at non-priority road 38 at T-junction 36 in order to turn right into priority road 40 from non-priority road 38. On priority road 40, there are another vehicle 42 approaching own vehicle 4 from the right-hand side of own vehicle 4, and three bicycles, 44a, 44b, and 44c approaching own vehicle 4 from the left-hand side of own vehicle 4. Bicycles 44a, 44b, and 44c are riding in single file in order of bicycles 44a, 44b, and 44c from closest to own vehicle 4.

At this time, moving object detector 10 detects three bicycles 44a, 44b, and 44c that are present in first detection region 28a as moving objects, based on the target information from first radar 6a. In addition, display controller 20 determines the degree of risk of bicycle 44a that is relatively close to own vehicle 4 to be higher than or equal to a predetermined threshold, and the degrees of risk of bicycles 44b and 44c that are relatively far from own vehicle 4 to be lower than the predetermined threshold.

As illustrated in FIG. 9, display controller 20 highlights moving object information 46a that relates to bicycle 44a with a degree of risk that is higher than or equal to the predetermined threshold. Specifically, display controller 20 highlights moving object information 46a by relatively increasing the display size of moving object information 46a, and making the display color of moving object information 46a a warning color (for example, red color).

In addition, as illustrated in FIG. 9, display controller 20 does not highlight moving object information 46b and 46c respectively related to bicycles 44b and 44c with degrees of risk that are lower than the predetermined threshold. Specifically, display controller 20 does not highlight moving object information 46b and 46c by making the display size of moving object information 46b and 46c relatively small.

As such, a notification can be given to the driver of own vehicle 4 about not only three bicycles 44a, 44b, and 44c approaching to own vehicle 4, but also that the degree of risk of bicycle 44a is highest among three bicycles 44a, 44b, and 44c.

The form of the highlighted display is not limited to the above described example, but may be, for example, a) blinking the display, b) moving animations on the display, or c) enclosing the entire display with a frame. In addition, the non-highlighted display form is not limited to the above described example, but may be, for example, d) relatively decreasing the brightness of the display, e) making the display opaque, or f) not displaying anything.

In the example illustrated in FIG. 9, display controller 20 displays moving object information 46a, 46b, and 46c separately, but the present disclosure is not limited to such an example. Display controller 20 may display moving object information 46a, 46b, and 46c as a group. In such a manner, display of moving object information 46a, 46b, and 46c can be simplified.

Other Variations

Although the safety confirmation support system according to one or more aspects has been described based on the embodiment described above, the present disclosure is not limited to the embodiment. Various modifications of each embodiment as well as an embodiment resulting from combinations of the structural elements of different exemplary embodiments that may be conceived by those skilled in the art may be included within the scope of one or more aspects as long as they do not depart from the essence of the present disclosure.

In the above described embodiment, display controller 20 stops display of the moving object information on the specified display unit, when the line of sight of the driver is towards the specified detection region while the moving object information is displayed on the specified display unit. However, for example, display controller 20 may perform as described below. In other words, display controller 20 may determine the degree of risk of the moving object based on the detection result from moving object detector 10, and when the degree of risk of the moving object becomes lower than the predetermined threshold while the moving object information is displayed on the specified display unit, display controller 20 may stop the display of the moving object information on the specified display unit. When the degree of risk of the moving object becomes lower than the predetermined threshold (for example, when the moving object has stopped moving), a safety confirmation relative to the moving object becomes unnecessary. Hence, unnecessary display of moving object information can be eliminated by stopping the display of the moving object information on the specified display unit.

Alternatively, it may be that display controller 20 determines the degree of risk of the road conditions in the specified detection region based on the detection result from moving object detector 10, and display controller 20 stops display of the moving object information on the specified display unit when the degree of risk of the road conditions becomes lower than the predetermined threshold while the moving object information is displayed on the specified display unit. When the degree of risk of the road conditions becomes lower than the predetermined threshold (for example, when vehicle 4 has moved to a road with good visibility), a safety confirmation relative to the moving object becomes unnecessary. Hence, unnecessary display of moving object information can be eliminated by stopping display of the moving object information on the specified display unit.

Alternatively, display controller 20 may change the color of the display of the moving object information when the line of sight of the driver is towards the specified detection region while the moving object information is displayed on the specified display unit.

Alternatively, the driver may choose as desired whether or not to stop the display of the moving object information on the specified display unit, when the line of sight of the driver is towards a specified detection region while the moving object information is displayed on the specified display unit.

In addition, in the above described embodiment, display controller 20 displays moving object information that relates to the moving object on the specified display unit, but the present disclosure is not limited to such an example. Display controller 20 may display information that relates to stationary objects other than moving objects on the specified display unit (for example, objects provided on the road that are in the blind spot of the driver). Alternatively, display controller 20 may display information that relates to an object that is currently standing still but was moving in the past (for example, a pedestrian who was going to cross the road, but is now stopped) on the specified display unit.

Each of the structural elements in the above-described embodiment may be configured in the form of an exclusive hardware product, or may be realized by executing a software program suitable for each of the structural elements. Each of the structural elements may be realized by means of a program executing unit, such as a central processing unit (CPU) and a processor, reading and executing the software program recorded on a recording medium such as a hard disk or a semiconductor memory.

In addition, some or all of the functions of the safety confirmation support system according to the above-described embodiment may be implemented by a processor, such as a CPU, executing a program.

Part or all of the structural elements constituting the respective devices may be configured as an IC card which can be attached and detached from the respective devices or as a stand-alone module. The IC card or the module is a computer system configured from a microprocessor, a ROM, a RAM, and so on. The IC card or the module may also include the aforementioned super-multi-function LSI. The IC card or the module achieves its function through the microprocessor's operation according to the computer program. The IC card or the module may also be implemented to be tamper-resistant.

The present disclosure may also be realized as the method described above. In addition, the present disclosure may be a computer program for realizing the previously illustrated method using a computer, and may also be a digital signal including the computer program. Furthermore, the present disclosure may also be realized by storing the computer program or the digital signal in a non-transitory computer readable recording medium such as flexible disc, a hard disk, a CD-ROM, an MO, a DVD, a DVD-ROM, a DVD-RAM, a BD (Blu-ray (registered trademark) Disc), and a semiconductor memory. Furthermore, the present disclosure may also include the digital signal recorded in these recording media. In addition, the present disclosure may also be realized by the transmission of the aforementioned computer program or digital signal via a telecommunication line, a wireless or wired communication line, a network represented by the Internet, a data broadcast and so on. Furthermore, the present disclosure may also be a computer system including a microprocessor and a memory, in which the memory stores the aforementioned computer program and the microprocessor operates according to the computer program. In addition, by transferring the program or the digital signal by recording onto the aforementioned recording media, or by transferring the program or digital signal via the aforementioned network and the like, execution using another independent computer system is also made possible.

While various embodiments have been described herein above, it is to be appreciated that various changes in form and detail may be made without departing from the spirit and scope of the present disclosure as presently or hereafter claimed.

Further Information about Technical Background to this Application

The disclosures of the following patent application including specification, drawings and claims are incorporated herein by reference in their entirety: Japanese Patent Application No. 2020-206871 filed on Dec. 14, 2020.

INDUSTRIAL APPLICABILITY

The present disclosure is applicable to, for example, a safety confirmation support system for supporting a safety confirmation of a driver of a vehicle.

What is claimed is:

1. A safety confirmation support system which supports a safety confirmation of a driver of a vehicle, the safety confirmation support system comprising:
   a moving object detector which detects a moving object that is coming relatively close to the vehicle in each of a plurality of detection regions set around the vehicle based on analyzing information received from radars and cameras provided on the vehicle;
   a plurality of display units provided in different directions when viewed from the driver, each of the plurality of display units being associated with a different one of the plurality of detection regions;
   a line-of-sight detector which detects a line of sight of the driver based on analyzing a facial image captured from a driver camera; and
   a display controller which controls the plurality of display units based on a detection result from the moving object detector and a detection result from the line-of-sight detector,
   wherein, on condition that the moving object is detected in a specified detection region among the plurality of detection regions, the display controller:
   (i) displays an image that relates to the moving object on a specified display unit associated with the specified detection region among the plurality of display units when the line of sight of the driver is away from the specified detection region,
   (ii) stops display of the entire image on the specified display unit when the line of sight of the driver is towards the specified detection region,
   (iii) determines a degree of risk of a road condition in the specified detection region based on the moving object detected by the moving object detector, and
   (iv) stops the display of the entire image on the specified display unit when the degree of risk of the road condition is determined to be lower than a predetermined threshold.

2. The safety confirmation support system according to claim 1,
   wherein the display controller further:
      determines a degree of risk of the moving object based on the detection result from the moving object detector; and
      stops the display of the entire image on the specified display unit when the degree of risk of the moving object becomes lower than a predetermined threshold.

3. The safety confirmation support system according to claim 1,
   wherein, when displaying the image on the specified display unit, the display controller further changes a display mode of the image on the specified display unit according to a state of the moving object.

4. The safety confirmation support system according to claim 3,
   wherein, when a plurality of the moving objects are detected in the specified detection region, the display controller displays a plurality of images that relate to the plurality of moving objects as a group on the specified display unit.

5. The safety confirmation support system according to claim 3, wherein the display controller further:
   determines a degree of risk of the moving object based on the detection result from the moving object detector, and
   when displaying the image on the specified display unit, highlights the image when the degree of risk of the moving object is higher than or equal to a predetermined threshold, and does not highlight the image when the degree of risk of the moving object is lower than the predetermined threshold.

6. The safety confirmation support system according to claim 1, wherein
   the road condition is road visibility, and
   when the degree of risk of the road visibility is below the predetermined threshold, the display controller stops the display of the entire image on the specified display unit.

7. A safety confirmation support method which supports a safety confirmation of a driver of a vehicle, the safety confirmation support method comprising:
   (a) detecting a moving object that is coming relatively close to the vehicle in each of a plurality of detection regions set around the vehicle by analyzing information received from radars and cameras set on the vehicle;
   (b) detecting a line of sight of the driver by analyzing a facial image captured from a driver camera; and
   (c) controlling a plurality of display units based on a detection result obtained in the detecting in (a) and a detection result obtained in the detecting in (b), the plurality of display units being provided in different directions when viewed from the driver and each being associated with a different one of the plurality of detection regions,
   wherein, when the moving object is detected in a specified detection region among the plurality of detection regions, the controlling in (c) includes:
   (i) displaying an image that relates to the moving object on a specified display unit associated with the specified detection region among the plurality of display units when the line of sight of the driver is away from the specified detection region,
   (ii) stopping display of the entire image on the specified display unit when the line of sight of the driver is towards the specified detection region,
   (iii) determining a degree of risk of a road condition in the specified detection region based on the detection of the moving object from the moving object detector, and
   (iv) stopping the display of the entire image on the specified display unit when the degree of risk of the road condition is determined to be lower than a predetermined threshold.

8. The safety confirmation support method of claim 7, wherein
   the road condition is road visibility, and
   the controlling in (c) further includes:
      stopping the display of the entire image on the specified display unit when the degree of risk of the road visibility is below the predetermined threshold.

* * * * *